F. H. VAN HOUTEN, Jr.
MACHINE FOR ROUNDING-UP LUMPS OF DOUGH IN THE MANUFACTURE OF BREAD.
APPLICATION FILED FEB. 18, 1909.
942,154.
Patented Dec. 7, 1909.
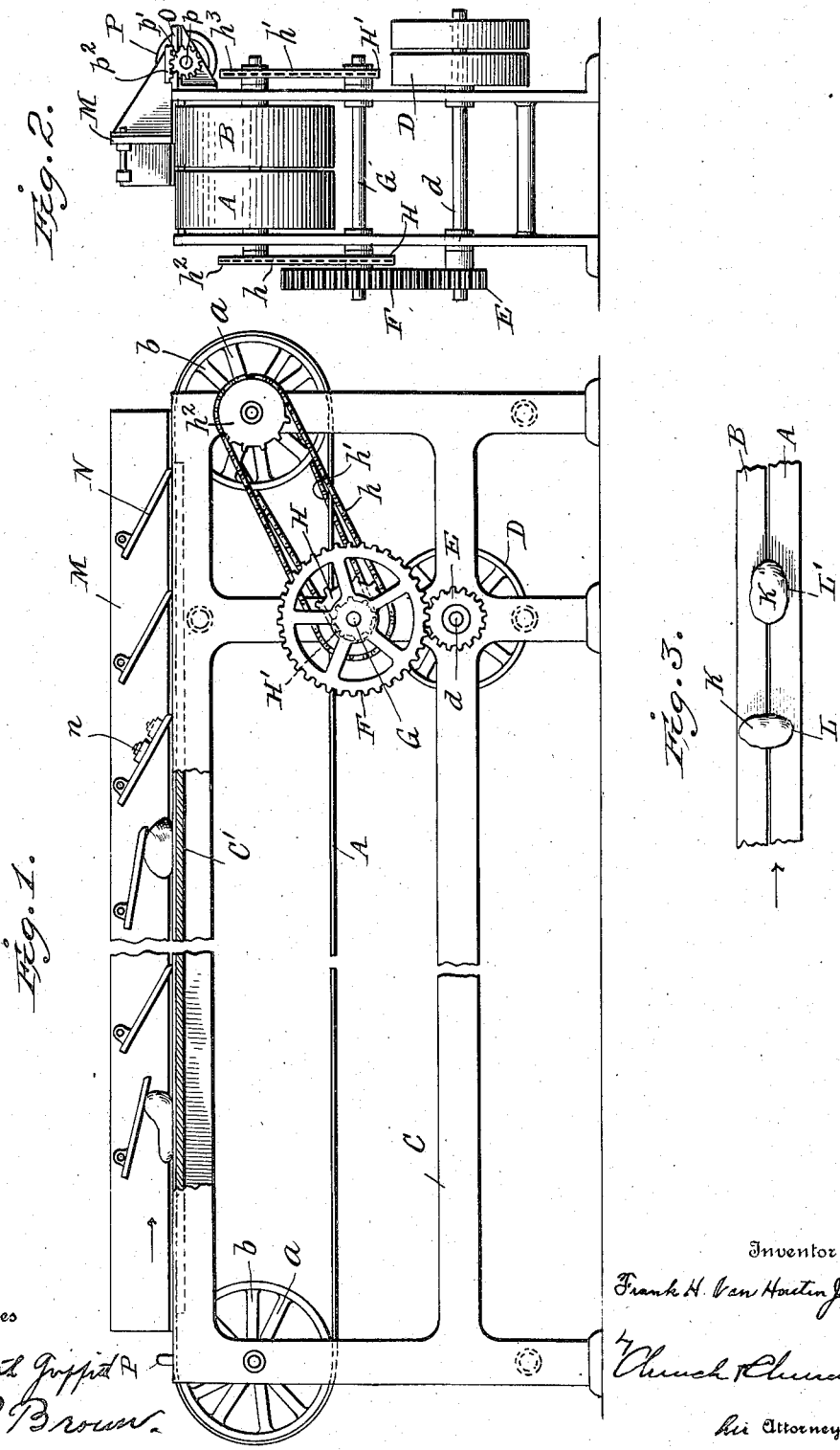

UNITED STATES PATENT OFFICE.

FRANK H. VAN HOUTEN, JR., OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

MACHINE FOR ROUNDING-UP LUMPS OF DOUGH IN THE MANUFACTURE OF BREAD.

942,154.   Specification of Letters Patent.   Patented Dec. 7, 1909.

Application filed February 18, 1909. Serial No. 478,646.

*To all whom it may concern:*

Be it known that I, FRANK H. VAN HOUTEN, Jr., a citizen of the United States, residing at Fishkill-on-the-Hudson, Dutchess county, New York, have invented certain new and useful Improvements in Machines for Rounding-Up Lumps of Dough in the Manufacture of Bread; and I do hereby declare the following to be a full, clear, and exact description of the same, reference being had to the accompanying drawings, forming a part of this specification, and to the figures and letters of reference marked thereon.

In accordance with approved practice in modern bakeries where large quantities of dough are made up at one time into bread, the lumps of dough after being weighed off or properly proportioned are rounded up by a peculiar process of molding with the hand. This process of rounding up gives to the pieces of dough a skin or smooth surface, and after being rounded up the lumps are set aside to prove when they will be ready for molding into shape for baking.

Many machines and mechanical appliances are employed for performing some of the steps of the rather long and intricate processes, and the present invention relates particularly to mechanism or machines for accomplishing the rounding up of the lumps and the imparting thereto of a proper skin or surface prior to the proofing, although it will be obvious to those skilled in the art that the invention may be used in other steps of the process or wherever it is desired to impart to lumps of plastic material a rounded contour and a smooth skin or surface.

Referring to the accompanying drawings: Figure 1 is a side elevation, partly broken away, and partly in section of a machine embodying the present invention. Fig. 2 is an end elevation looking at the right hand end of the machine shown in Fig. 1. Fig. 3 is a diagrammatic plan view illustrative of the action of the traveling belts in rotating the lump of material on an axis at an angle to the plane of travel of the belt.

Similar characters of reference indicate like parts in all the views.

In the simple embodiment of the invention illustrated, a pair of parallel belts A and B are mounted to travel over pulleys $a$ and $b$ journaled in opposite ends of a main frame C of any suitable character. The pulleys $a$ and $b$ are capable of independent rotation and a driving mechanism is provided which will impart a differential speed in the same direction to the pulleys and belts running thereon, thus the pulleys $a$ and belt A travel at a higher speed than the pulleys $b$ and belt B, preferably at twice the speed of the latter. A convenient and efficient driving mechanism consists, as shown, of fast and loose driving pulleys lettered D, to which a power belt is applied. One of the pulleys D drives a shaft $d$ carrying at one end a pinion E meshing with a larger gear F on a shaft G. This shaft G carries in proximity to its opposite ends sprocket wheels H and H' one having twice as many teeth as the other, and said sprocket wheels through sprocket chains $h$ and $h'$ drive sprocket wheels $h^2$ and $h^3$, one connected with one pulley $a$ and the other connected with one pulley $b$.

In the preferred arrangement the belts are not only parallel to each other, but in substantially the same plane between the pulleys, and are adapted to travel over a supporting surface or table C' conveniently formed as a part of the frame of the machine. Obviously, the lumps of dough or similar material deposited on the belts and partly resting on both, will, in being carried forward, tend to rotate on a vertical axis, as illustrated, for instance in Fig. 3, where the lump of dough K in traveling from the position indicated at L to that indicated at L' is given substantially a quarter turn. This movement of the lump of dough or similar material is not of itself sufficient to impart the desired conformation thereto, and, therefore, it becomes necessary to provide a surface or surfaces with which the dough will contact during its travel along with the belts, and, as shown, a transversely adjustable but longitudinally fixed guiding and contacting surface in the form of a board M extends parallel with and preferably over one edge of the slow belt B. Obviously, by being located in position to contact with the more slowly moving side of the lump, it will prevent said lump from being pushed entirely off of the belt A, and further by adjusting the position of the contacting surface M a greater or less proportion of the weight of the lump may be made to rest on either one or the other of the belts, and a corresponding variation in the movement of the dough effected. The surface along which the lump is carried by the belts and with which it contacts may be made of various conformations calculated to produce the particular results desired and may, in part, extend over the lump of dough. In the preferred arrangement that portion or those portions of the contacting surface which extend over the lump of dough are preferably of a yielding character, and in the form of a series of pivoted boards which may be termed hands N, pivotally supported at one end on the board M and free to swing at their opposite ends toward and from the belts. In normal position, the free ends of the hands rest in proximity to the upper surface of the belts. Obviously, well known means may be provided for varying the pressure exerted by the hands in a downward direction, such, for instance, as the adjustable weight indicated at $n$.

In operation, the contacting surface formed by the parts M and N retard the part of the lump engaging therewith and by wiping and smoothing action tend not only to round the same up, but impart a surface finish thereto closely approximating the finish secured by hand manipulation, as heretofore practiced.

Generally speaking, the action on the lump of dough is as follows: The irregularly shaped lump deposited on the belts and partly resting on both is rolled along on an axis more or less perpendicular to the supporting surface until it contacts with the first hand N, where it is rounded up and smoothed into a slightly elongated irregularly-shaped roll, as shown, for instance at L, Fig. 3, and escaping from the first hand it is rotated on a more or less perpendicular axis, substantially 90° before contacting with the second hand. Thus the lump is presented to the second hand in the direction of its greatest length and is again formed into a slightly elongated roll having an axis at substantially right angles to the axis of the roll formed by the first hand, and this action continues throughout the machine, the resultant conformation being a well rounded up and smooth lump ready for the proofing step of the process.

It is not essential to the operation of the machine that the lump of dough should contact with a series of overhanging surfaces, as the action may be made continuous and one long hand or overhanging surface employed inasmuch as the tendency of the belts and the contacting surface will result in rolling the lump about an axis at an angle to the plane of movement of the lump and will cause the mass of the lump to constantly shift around the said axis by the wiping and smoothing action of the surfaces supporting and with which the lump contacts.

For adjusting the contacting surface laterally it is conveniently mounted on a slideway O, Fig. 2, and a hand wheel P mounted on a shaft $p$ carries a plurality of pinions $p'$ meshing with a rack $p^2$ on the base of the contacting surface.

The belts may be of any suitable material, but are preferably of canvas which may be kept in a clean and sanitary condition.

Having thus described the invention, what I claim as new and desire to secure by Letters-Patent, is:

1. In a rounding up machine, the combination of the following instrumentalities, to wit: a pair of parallel belts with means for moving the same in the same direction at a differential speed, and a longitudinally fixed contacting surface located in proximity to the belts, the arrangement being such that a lump of material supported on the belts and rotated on a substantially perpendicular axis by the differential movement of the belts will contact with said surface.

2. In a rounding up machine, the combination of the following instrumentalities, to wit: a plurality of supporting surfaces arranged side by side, means for imparting differential movement to said surfaces simultaneously in the same direction and a contacting surface extending longitudinally of said surfaces, the arrangement being such that a lump of material lying on both said supporting surfaces and advanced thereby will coöperate with said contacting surface.

3. In a rounding up machine, the combination of the following instrumentalities, to wit: a plurality of longitudinally movable supports arranged side by side, means for imparting differential movement to said supports simultaneously in the same direction, a longitudinally extending contacting surface lying in proximity to the slower moving support and with which the lump contacts to maintain its engagement with the more rapidly moving surface.

4. In a rounding up machine, the combination of the following instrumentalities, to wit: a plurality of longitudinally movable supporting surfaces arranged side by side, means for imparting differential movement to said surfaces simultaneously in the same direction, a longitudinally extending contacting surface adjustably mounted in proximity to the slower moving supporting surface and with which the lump contacts to maintain its position in engagement with the more rapidly moving supporting surface.

5. In a rounding up machine, the combination of the following instrumentalities, to wit: longitudinally movable supporting surfaces arranged side by side and extending in the same plane, means for imparting differential movement to the said surfaces simultaneously in the same direction, and a contacting surface overlying said supports and with which the upper portion of the lump carried by the supports contacts, whereby the upper portion of the lump is retarded and its surface smoothed in its passage under the contacting surface.

6. In a rounding up machine, the combination of the following instrumentalities, to wit: a plurality of parallel supporting belts arranged side by side, means for imparting differential movement to said belts simultaneously in the same direction, an upwardly extending guide forming a contacting surface arranged in proximity to the slower moving belt and an overhanging contacting surface supported by said guide and adapted to contact with the upper side of the lump carried by the belt.

7. In a rounding up machine, the combination of the following instrumentalities, to wit: a pair of parallel supporting belts having their supporting surfaces in the same plane, means for imparting differential movement to said belts simultaneously in the same direction, an upwardly extending longitudinally arranged guide located in proximity to the slower moving belt, and a movable contacting surface supported by said guide and overlying the supporting belts for coöperation with the upper side of the lump advanced by the belts.

8. In a rounding up machine, the combination of the following instrumentalities, to wit: a plurality of supporting belts, means for imparting differential movement to said belts simultaneously in the same direction, a longitudinally arranged member located in proximity to said belts, and a plurality of movable contacting surfaces carried by said member and overlying the belts for coöperation with the upper side of a lump advanced and rotated by the belts.

9. In a rounding up machine, the combination of the following instrumentalities, to wit: a plurality of carrying belts, means for imparting differential movements to said belts simultaneously in the same direction, a longitudinally extending member arranged in proximity to the belts, and a plurality of pivoted contacting surfaces carried by the said member and overlying the belts in position for successively coöperating with the upper side of the lump advanced and rotated by the belts.

10. In a rounding up machine, the combination of the following instrumentalities, to wit: a plurality of supporting belts, means for imparting differential movement to said belts simultaneously in the same direction, and a series of pivoted hands overlying the said belts and with which the upper surface of the lump successively contacts while being advanced and rotated by the belts.

FRANK H. VAN HOUTEN, Jr.

Witnesses:
F. H. VAN HOUTEN,
HOWARD B. WILTSE.